No. 864,124. PATENTED AUG. 20, 1907.
C. A. DUNBAR.
COMB.
APPLICATION FILED JAN. 8, 1906.
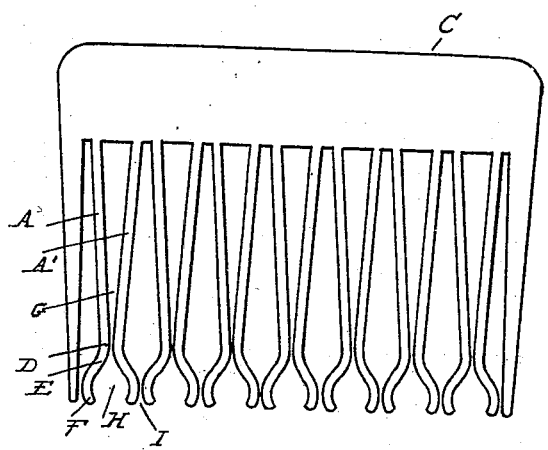

UNITED STATES PATENT OFFICE.

CLEMENT A. DUNBAR, OF DETROIT, MICHIGAN.

COMB.

No. 864,124.  Specification of Letters Patent.  Patented Aug. 20, 1907.

Application filed January 8, 1906. Serial No. 295,075.

*To all whom it may concern:*

Be it known that I, CLEMENT A. DUNBAR, a citizen of the United States of America, residing at Detroit, in the county of Wayne and State of Michigan, have invented certain new useful Improvements in Combs, of which the following is a specification, reference being had therein to the accompanying drawings.

The invention relates to new and useful improvements in combs, and consists in the construction of pairs of tines or teeth connected together at their upper ends and tapering toward each other to a point near the outer or free end, from which point they separate and then curve inward toward each other, so as to make two clamping sections for each pair of teeth.

In the drawings, I have shown a side elevation of the comb.

In making the comb, I construct it of any suitable material, with each pair of tines A A′ connected together at the top by a relatively wide curved or straight portion of the comb back C. The two tines A A′ taper from the connecting portion toward each other down to near the lower or free end. At the point D, which is the point of closest approximation, the tines are bent outwardly or from each other in the section E and then the ends are curved or bent inwardly in the section F, so that they are normally spaced a distance equal to the space at the top. This construction forms two clamping portions, *i. e.*, when put in the hair, the hair will not only be clamped in the space G but also in the space H.

It is obvious also that not only do I get the benefit of the double-clamping effect described, but I also get a wedge-shaped opening at I for the entering hair between the adjacent tines which together go to make up the comb.

Alternate tines are preferably parallel, that is, all the tines A are parallel and all the tines A′ are parallel and, as the tines in each pair A A′ are arranged at angles to each other, as described, each pair of tines, A′ A, that is the adjacent tines of adjacent pairs A A′, will bear a different relation to each other. Referring to the drawings, it will be seen that this arrangement forms a series of wedge shaped openings extending from the back of the comb to near the tips of the tines and an intermediate series of wedge shaped openings extending from near the free ends of the tines to the comb back. These two series, together with the wedge shaped openings I, and the space H, above described, permit the comb to be inserted in the hair without difficulty, and when the comb is once in place accidental displacement is practically absolutely prevented.

What I claim as my invention is:—

A hair fastener comprising a back and a plurality of tines, alternate tines being parallel and set at an angle to the intermediate tines to form a series of wedge shaped openings extending from the back towards the points of the tines and an intermediate series of wedge shaped openings extending from near the points of the tines to the back, each pair of tines forming said first series of openings having their ends curved divergently from the point of the wedge and their extreme tips slightly curved towards each other whereby large wedge shaped entrances are formed for said first series of openings and small wedge shaped entrances for said intermediate series of openings, for the purpose described.

In testimony whereof I affix my signature in presence of two witnesses.

CLEMENT A. DUNBAR.

Witnesses:
 JAMES P. BARRY,
 EDWARD D. AULT.